Figure 1:
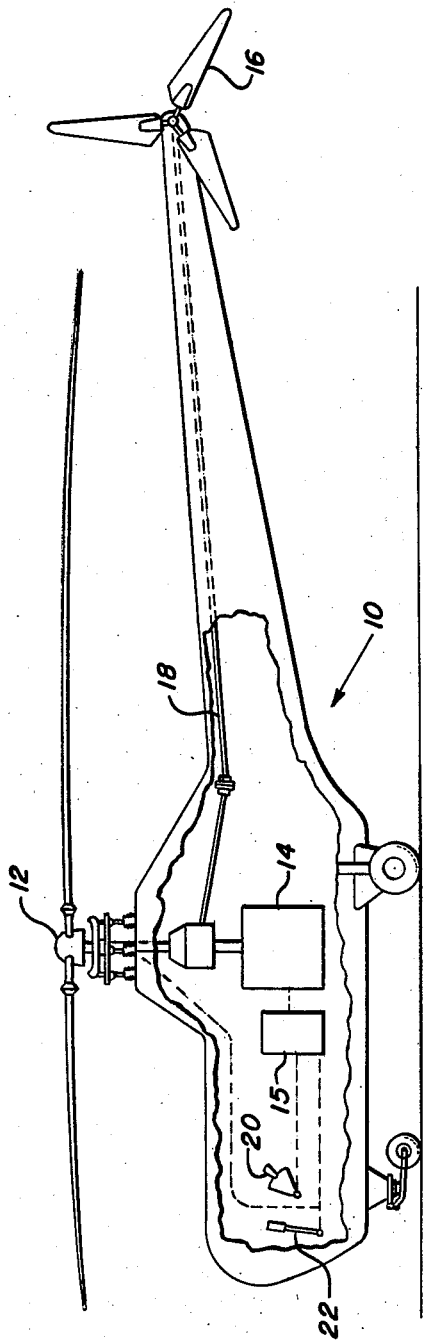

June 2, 1953     D. M. PLUMB     2,640,551
THROTTLE CONTROL WITH AUTOMATIC GOVERNOR
Filed Oct. 15, 1948     2 Sheets-Sheet 1

DONALD M. PLUMB
INVENTOR

BY *M. B. Tasker*
ATTORNEY

DONALD M. PLUMB
INVENTOR

BY M. B. Tasker
ATTORNEY

Patented June 2, 1953

2,640,551

UNITED STATES PATENT OFFICE 2,640,551

THROTTLE CONTROL WITH AUTOMATIC GOVERNOR

Donald M. Plumb, Bridgeport, Conn., assignor to United Aircraft Corporation, East Hartford, Conn., a corporation of Delaware Application October 15, 1948, Serial No. 54,753

6 Claims. (Cl. 170—135.74)

This invention relates to aircraft and more specifically to governor control systems for power plants as applied to helicopters and the like.

In helicopters it is a usual practice to connect the engine throttle directly to the total pitch change control so that the engine output will be proportionately varied with total pitch change. During normal cruising, however, it is desirable to maintain the speed of the engine and the rotor at some efficient predetermined value so that aerodynamic variations in load during flight will be compensated for by proportionate variations in engine output.

It is therefore an object of this invention to provide a throttle control for heilcopters and the like wherein a governor is utilized to maintain the engine speed at a predetermined setting during flight.

Another object of this invention is to provide a combination manual and automatic throttle control for helicopter engines in order to maintain a constant engine speed regardless of aerodynamic load fluctuations on the rotor blades.

A further object of this invention is to provide an automatically governed throttle control for helicopters including a mixing mechanism which permits an override in the system so that upon manual variations of total pitch by the pilot the throttle setting for the engine will be proportionately changed to maintain a constant speed during such large power demand changes.

A still further object of this invention is to provide in combination with the foregoing a pilot operated engine speed trim adjustment and in addition a follow-up system for the automatic speed controller so as to prevent hunting in the system.

These and other objects and advantages will become readily apparent from the following detail description of the drawings wherein like reference numerals refer to like parts throughout.

Figure 2:
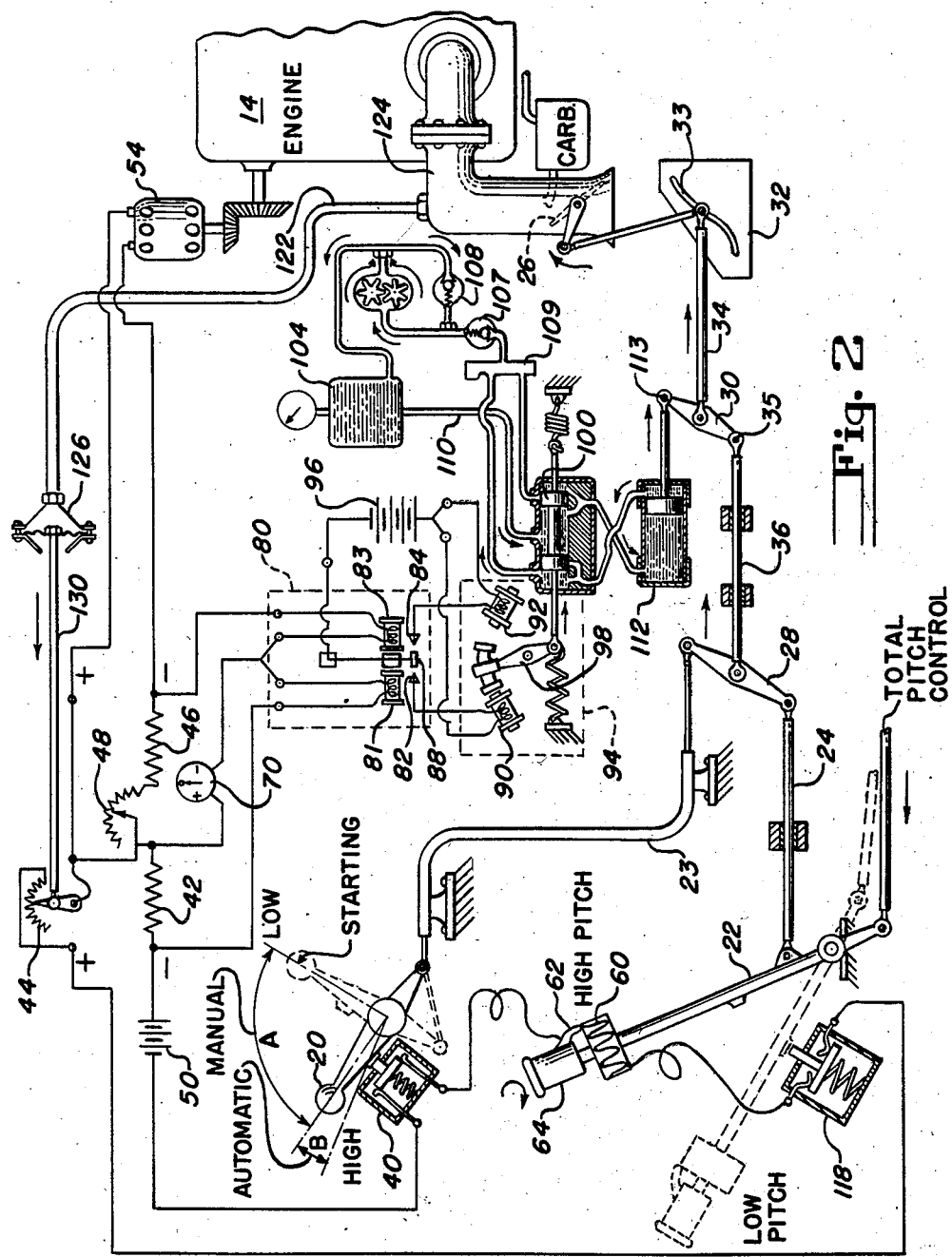

In these drawings,

Fig. 1 is a side elevation of a helicopter having an engine control system according to this invention; and Fig. 2 is a detail schematic view of the engine control system of this invention.

Referring to Fig. 1, the numeral 10 generally indicates a helicopter having a variable pitch rotor 12 which is driven by an engine 14. A tail rotor 16 is also driven by the engine 14 via the drive shaft 18 at a fixed ratio speed in relation to the main rotor 12. The automatic throttle control governor 15 of this invention is interposed between manual throttle control 20, the total pitch control 22 and the engine in a manner to be described hereinafter.

Referring to Fig. 2, the throttle control 20, which has a manual range A and an automatic range B, and the total pitch control 22 are both connected to a butterfly valve 26 at the engine 14 by means of a flexible cable 23 and a link 24, respectively, two mixing levers 28 and 30, connectors 34 and 36, and a cam arrangement 32. The cam arrangement 32 includes a sloping curved slot which permits the transmission of motion from the connector 34 to the butterfly valve 26 to have the best relation between the fully closed and open positions of the valve and the pitch setting. The throttle control 20 is so rigged that in its maximum or high position the butterfly valve 26 is not fully open so that additional power may be obtained from the engine 14 by further opening the butterfly valve as a result of actuation by the total pitch control 22 and/or the automatic control system to be described hereinafter.

To this end when the throttle control 20 is moved to its high or automatic position a micro switch 40 is closed so as to cut in a balanced governing system. The governing system comprises voltage divider resistances 42 and 44 on one side of the circuit and the resistances 46 and 48 on the other side. A bias battery 50 provides a power source for the resistances 42 and 44 which tends to balance the output of the engine driven direct current generator 54 and its corresponding resistances 46 and 48. The generator circuit is adjustable on the ground inasmuch as the resistance 48 is variable. On the other hand, the biasing battery circuit can be adjusted in flight during automatic operation by means of the trim throttle rheostat 60 whose resistance is varied by the contact arm 62 which is controlled by the grip 64 on the total pitch change control 22. The trim rheostat 60 thus affords a range of selection to set the engine for varied predetermined speeds.

It will then be evident that when the engine speed is such that output of the generator circuit is in balance with the biased battery circuit the ammeter 70 will read zero and no current will flow to the electrically balanced relay 80. The sensitive relay 80 consists of the contacts and coils 81, 82 and 83, 84 either of which will be energized when an unbalance takes place in the divider resistances of the generator and biased battery circuits. When an unbalance does occur the contact arm 88 of the relay 80 will move to one side so as to energize either the solenoid 90 or 92 within the power solenoid unit 94. It should be noted that the contact arm 88 merely closes the circuit from the battery 96 to either of the solenoid coils 90 or 92.

Energization of either of the solenoids 90 or 92 results in the displacement of the spring balanced rocker arm 98 which is pivotally supported intermediate its ends and controls a selector valve 100 of a hydraulic actuating system.

The hydraulic system comprises a pressurized reservoir 104, a pump 106, a check valve 107, a relief valve 108, a return manifold 109, and a pressure line 110. The selector valve 100, it is evident, controls a servomotor 112 which actuates one of the pivot ends 113 of the mixing lever 30 which, as stated previously, controls the butterfly throttle valve 26 via the connector 34 and the cam arangement 32.

It is well known that the ordinary butterfly valve type throttle control has greater effect on engine output for a given movement near its closed position than it has for a corresponding movement near its full open position, hence the cam arrangement 32 maintains, as near as possible, a straight line relation between engine output and the controlling movements of the automatic governor and the manually operated mechanism.

In operation then, in starting the engine 14 the throttle control 20 will be in its low position so that the micro-switch 40 will be biased open by its integral spring while the total pitch control 22 will also be in its low position thereby opening the micro-switch 118 so that the automatic system is doubly disengaged.

When the helicopter is in flight, however, the throttle control lever 20 is moved to its high or automatic position thereby closing the micro-switch 40 while the total pitch control 22 is at some intermediate position other than low pitch so that the micro-switch 118 is also closed. It is then apparent that the system will assume a position in which the biased battery circuit will balance the output of the generator circuit, these two circuits having been adjusted so that they are in balance for a given voltage output of the generator 54 at a predetermined engine speed as determined by the position of rheostat 60. In the event that any sudden gusts of wind and the like are encountered in flight thereby increasing the loading on the rotor 12, such loads will be immediately transmitted to the engine 14 tending to slow it down. Any drop in R. P. M. will correspondingly decrease the voltage output of the generator 54 thereby unbalancing its output as against the output of the biased battery circuit so that current will flow from the biased battery circuit to the coil 81 in the balanced relay 80 to swing the contact arm 88 to the left and energize through contact 82 the solenoid 90 of the solenoid unit 94. As the solenoid 90 is energized the rocker arm 98 will be moved to the left from its spring biased center position and in turn will move the selector valve 100 so that pressure from the line 110 will flow to the left side of the servomotor which is then actuated toward the right as indicated by the arrows in Fig. 2. Actuation of the servomotor imparts motion to the pivot end 113 of the mixing lever 30 which will tend to swing about its opposite pivot end 35 since the connector 36 can be assumed a fixed pivotal point for any given total pitch setting. Pivotal movement of lever 30 moves the connector 34 along the slot 33 of the cam arrangement 32 to further open the throttle butterfly valve 26 and thereby obtain additional power from the engine.

In order to prevent hunting during this increased power condition, a pressure line 122 is connected to the engine intake manifold 124 and also to a diaphragm housing 126. It is then apparent that as the manifold pressure increases the pressure in the line 122 also increases so that the diaphragm in housing 126 will actuate the lever 130 toward the left to increase the resistance in the variable resistor 44 and simultaneously increase the voltage drop in the biased battery circuit to tend to return the circuit to a balanced relationship with the generator circuit. Thus the opening movement of the throttle will be stopped when a new balance is effected.

In contrast, any overspeed condition of the engine 14 will cause an increased voltage output from the generator 54 so that its corresponding circuit will overbalance the biased battery circuit. Thereafter the coil 83 in the balanced relay 80 and the solenoid 92 will be energized so that a throttle decrease movement will be subsequently effected by the hydraulic servomotor 112. Here also it will be evident that as the throttle is gradually closed the follow-up rheostat 44 will be decreased in resistance so as to reach a balanced condition with the generator circuit thereby stopping the throttle decrease movement prior to its reaching an over-controlled position. This follow-up is important in a helicopter since in an overspeed condition the inertia of the rotors will tend to maintain the engine in an overspeed condition somewhat longer than usual and as a result the governor control system would be prone to continued throttle closing movement to a position below that necessary for maintaining the predetermined engine speed. Hence the follow-up system will tend to stop the closing movement of the throttle so that a balanced circuit is obtained at some intermediate point. Following such balanced condition the rotors will have lost their overspeed inertia and an immediate increase in throttle will not be necessary with the exception of a possible minor automatic adjustment. It is obvious that without a follow-up the throttle would tend to close excessively and following the loss of inertia in the overspeeding rotor an additional throttle opening movement would be necessary and hunting would ensue.

When the total pitch is changed for any reason during flight, the throttle valve 26 will be correspondingly varied but in a higher degree than necessary to maintain the predetermined engine speed. This it will be evident, is necessary because a varied manifold pressure will result which in turn will change the resistance of the rheostat 44. The change in resistance of the rheostat will tend to create a closing throttle unbalance in the governor control system and return the throttle to a desired position for maintaining the predetermined speed of the engine. In addition it may be desirable to properly readjust the engine speed by utilizing the trim control 60 on the total pitch control 22.

It is then obvious that as a result of this invention a throttle control has been provided for helicopter installations and the like whereby engine power can be positively varied manually during starting or during total pitch changes while at the same time an automatic governing system is available to maintain the engine at a predetermined efficient speed. Further, this desirable predetermined speed can be minutely varied for varied conditions of cruise by a pilot operated electric trim regulator.

In addition, as a result of this invention, safety devices have been incorporated in the form of micro-switches so that inadvertent dangerous misuse of the automatic control system is prevented.

Although only one embodiment of this invention has been described and shown herein, it is obvious and evident that various changes and modifications can be made in the arrangement and the shape of the parts without materially departing from the scope of the novel concept.

What it is desired to secure by Letters Patent is:

1. In a helicopter, a variable pitch rotor, an engine for driving said rotor, a throttle valve for said engine, a throttle valve control operatively connected with said throttle valve having a manual and an automatic range of operation, means operatively connected to said throttle valve and operative when said control is in automatic position for regulating the speed of said engine including means driven by the engine and responsive to variations in the speed of said engine from a predetermined value for controlling said throttle valve, follow-up means connected to said first mentioned means and responsive to the controlled movements of said throttle valve to suppress hunting in said throttle control means, and manually operable means having a connection to said rotor and operable independently of said throttle valve control for varying the pitch of said rotor including mechanism operably connected with said throttle valve for controlling the latter when said throttle valve control is in either of said ranges.

2. In a helicopter, a variable pitch rotor, an engine for driving said rotor, a throttle valve for said engine, a throttle valve control having a manual and an automatic range of operation, means for varying the pitch of said rotor operable independently of said throttle valve control, electrical means operatively connected to said throttle valve and operable when said throttle control is in its automatic range for detecting speed variations in said engine including a generator driven by said engine, hydraulic means operably connected with said electrical means and movable in response to the speed variation detections of said electrical means controlling said throttle valve, and mixing means interconnecting said pitch varying means and said hydraulic means to said throttle valve for maintaining said engine at a predetermined speed.

3. A helicopter according to claim 2 wherein the pitch varying means includes means operatively connected to said electrical means for selectively adjusting the predetermined speed of the engine.

4. In a helicopter, in combination, a variable pitch rotor subjected to controlled and uncontrolled loads, an engine for driving said rotor, a throttle valve for controlling the output of said engine, a throttle valve control having a manual and an automatic range of operation, means operatively connected to said throttle valve and operable independently of said throttle valve control for varying the pitch of said rotor thereby producing controlled loads thereon, electrical means operatively connected to said throttle valve and operable when said throttle control is in said automatic range for detecting speed variations in said engine resulting from uncontrolled loads on said rotor, hydraulic means including a servomotor having an operative connection with said throttle and movable in response to speed variation detections of said electrical means, mixing means interconnecting said pitch varying means and said hydraulic means to said throttle valve for maintaining said engine at a predetermined speed, and follow-up means connected to said electrical means and responsive to the controlled movements of said throttle valve for opposing movements of said throttle.

5. In a helicopter, a rotor having high and low pitch ranges, an engine for driving said rotor, a throttle for said engine, control mechanism connected to said throttle and having a manual and an automatic range of operation, a first means including a power operated member connected to said throttle for automatically varying the setting of said throttle to maintain a predetermined engine speed while said control mechanism is in said automatic range in response to variation of aerodynamic loads on said rotor, a manual pitch control for said rotor operatively connected to said throttle and to said rotor for simultaneously changing said pitch and throttle settings to maintain a predetermined engine speed while said throttle control mechanism is in either of said ranges, and a second means connected to said first means and responsive to said throttle setting variations while said throttle control is in said automatic range to follow-up said first means and maintain a throttle setting substantially free of hunting.

6. A control system according to claim 5 wherein said first means for automatically varying the setting of said throttle to maintain a predetermined engine speed includes a servomotor having a connection to said throttle and a cam mechanism in said connection between said servomotor and said throttle for effecting a straight line engine power output relation with respect to movements of said servomotor.

DONALD M. PLUMB.

References Cited in the file of this patent

UNITED STATES PATENTS

| Number | Name | Date |
|---|---|---|
| 2,066,819 | Berry | Jan. 5, 1937 |
| 2,318,260 | Sikorsky | May 4, 1943 |
| 2,343,378 | Kieser | Mar. 7, 1944 |
| 2,412,360 | Schorn | Dec. 10, 1946 |
| 2,478,796 | Willi | Aug. 9, 1949 |
| 2,517,150 | Webb | Aug. 1, 1950 |
| 2,525,460 | Roesch | Oct. 10, 1950 |

FOREIGN PATENTS

| Number | Country | Date |
|---|---|---|
| 119,454 | Great Britain | Mar. 2, 1920 |